US006691087B2

(12) United States Patent
Parra et al.

(10) Patent No.: US 6,691,087 B2
(45) Date of Patent: *Feb. 10, 2004

(54) METHOD AND APPARATUS FOR ADAPTIVE SPEECH DETECTION BY APPLYING A PROBABILISTIC DESCRIPTION TO THE CLASSIFICATION AND TRACKING OF SIGNAL COMPONENTS

(75) Inventors: Lucas Parra, New York, NY (US); Aalbert de Vries, Lawrenceville, NJ (US)

(73) Assignees: Sarnoff Corporation, Princeton, NJ (US); LG Electronics, Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,697

(22) Filed: Sep. 30, 1998

(65) Prior Publication Data

US 2002/0184014 A1 Dec. 5, 2002

Related U.S. Application Data

(60) Provisional application No. 60/066,324, filed on Nov. 21, 1997.

(51) Int. Cl.[7] .................................................. G10L 15/00

(52) U.S. Cl. ......................... 704/240; 704/231; 704/236

(58) Field of Search ................................ 704/331, 236, 704/240

(56) References Cited

U.S. PATENT DOCUMENTS 4,837,831 A * 6/1989 Gillick et al. ............... 704/240
5,598,507 A * 1/1997 Kimber et al. .............. 704/246
5,799,276 A * 8/1998 Komissarchik et al. ..... 704/251
5,839,105 A * 11/1998 Ostendorf et al. .......... 704/231
5,884,261 A * 3/1999 de Souza et al. ........... 704/255
5,946,656 A * 8/1999 Rahim et al. ............... 704/256

OTHER PUBLICATIONS

"Sequential Algorithms for Parameter Estimation Based on the Kullback–Leibler Information Measure", Weinstein et al., IEEE Transactions on Acoustics, Speech, and Signal Processing, vol. 38, No. 9, Sep. 1990, pp. 1652–1654.

"Frequency Domain Noise Suppression Approaches in Mobile Telephone Systems", J. Yang, IEEE 1993, pp. II–363–II–366.

"Robust Speech Pulse Detection Using Adaptive Noise Modelling", N. B. Yoma et al., Electronics Letters, Jul. 18, 1996, vol. 32, No. 15, pp. 1350–1352.

"Perceptual Wavelet–Representation of Speech Signals and its Application to Speech Enhancement", I. Pinter, Computer Speech and Language (1996) 10, pp. 1–22.

"A New View of the EM Algorithm That Justifies Incremental and Other Variants", R. M. Neal and G. E. Hinton, pp. 1–11. Feb. 12, 1993.

"The Study of Speech/Pause Detectors for Speech Enhancement Methods", P. Sovka and P. Pollak, EUROSPEECH'95.

"Cepstral Speech/Pause Detectors," P. Pollak et al., IEEE Workshop on Nonlinear Signal and Image Processing, 1995.

* cited by examiner

*Primary Examiner*—Vijay Chawan
*Assistant Examiner*—Michael N. Opsasnick
(74) *Attorney, Agent, or Firm*—William J. Burke

(57) ABSTRACT

A signal processing system for detecting the presence of a desired signal component by applying a probabilistic description to the classification and tracking of various signal components (e.g., desired versus non-desired signal components) in an input signal is disclosed.

14 Claims, 4 Drawing Sheets

METHOD AND APPARATUS FOR ADAPTIVE SPEECH DETECTION BY APPLYING A PROBABILISTIC DESCRIPTION TO THE CLASSIFICATION AND TRACKING OF SIGNAL COMPONENTS

This application claims the benefit of U.S. Provisional Application No. 60/066, 324 filed Nov. 21, 1997, which is herein incorporated by reference.

The present invention generally relates to an apparatus and a concomitant method for processing a signal having two or more signal components. More particularly, the present invention detects the presence of a desired signal component, e.g., a speech component, in a signal using a decision function that is adaptively updated.

BACKGROUND OF THE DISCLOSURE

In real world environments, many observed signals are typically composites of a plurality of signal components. For example, if one records an audio signal within a moving vehicle, the measured audio signal may comprise a plurality of signal components, such as audio signals attributed to the tires rolling on the surface of the road, the sound of wind, sounds from other vehicles, speech signals of people within the vehicle and the like. Furthermore, the measured audio signal is non-stationary, since the signal components vary in time as the vehicle is traveling.

In such real world environments, it is often advantageous to detect the presence of a desired signal component, e.g., a speech component in an audio signal. Speech detection has many practical applications, including but not limited to, voice or command recognition applications. However, speech detection methods are usually based on discriminating the total or component-wise signal power. For example, the component-wise signal powers are combined into a predefined ad-hoc decision function, which then generates a decision whether the current frame contains speech or not.

However, there are at least several difficulties associated with ad-hoc decision functions. First, ad-hoc decision functions often require the adjustment of a threshold which often is suboptimal for time-varying Signal-to-Noise Ratio (SNR). Second, it has been noted that many ad-hoc decision functions tend to falsely detect speech during long non-speech periods.

Therefore, a need exists in the art for detecting the presence of a desired signal component, e.g., a speech component, in a non-stationary signal using a decision function that is adaptively updated.

SUMMARY OF THE INVENTION

The present signal processing system detects the presence of a desired signal component by applying a probabilistic description to the classification and tracking of the various signal components (e.g., desired versus non-desired signal components) in an input signal. Namely, an N mixture model (e.g., a dual mixture where N=2) is used, where the model densities capture N signal components, e.g., two signal components having speech and non-speech features that are observed in the past, e.g., past audio frames. Classification of a new frame is then simply a matter of computing the likelihood that the new frame corresponds to either class. In turn, an optimal threshold can be adaptively generated and updated.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
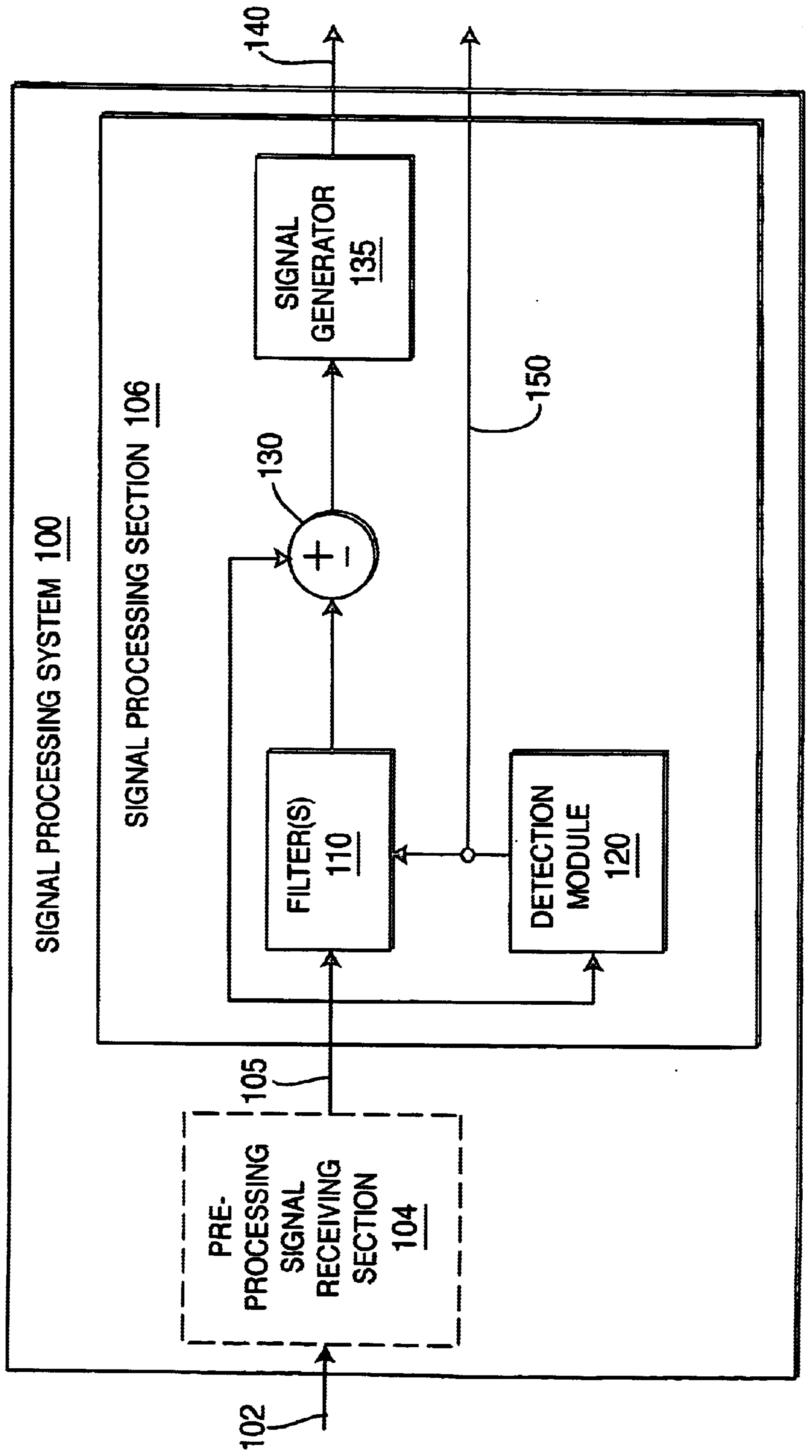
FIG. 1 depicts a block diagram of a signal processing system of the present invention.

FIG. 1 depicts a block diagram of a signal processing system 100 of the present invention. The signal processing system 100 consists of an optional signal pre-processing/receiving section 104 and a signal processing section 106.

More specifically, signal pre-processing section 104 serves to receive non-stationary signals on path 102, such as speech signals, financial data signals, or geological signals. Pre-processing section 104 may comprise a number of devices such as a modem, an analog-to-digital converter, a microphone, a recorder, a storage device such as a random access memory (RAM), a magnetic or optical drive and the like. Namely, pre-processing section 104 is tasked with the reception and conversion of a non-stationary input signal into a discrete signal, which is then forwarded to signal processing section 106 for further processing. As such, depending on the non-stationary signals that are being processed, pre-processing section 104 may comprise one or more components that are necessary to receive and convert the input signal into a proper discrete form. If the input signal is already in the proper discrete format, e.g., retrieving a stored discrete signal from a storage device, then pre-processing section 104 can be omitted altogether.

The discrete non-stationary signal on path 105 is received by the signal processing section 106 which may apply one or more filters 110 to process the non-stationary signal for different purposes and in different fashions. For example, the signal processing section 106 may apply a plurality of Gamma Delay line (GDL) filters having outputs that are representative of estimated power spectrums of the signal components of the input signal. Namely, the output of each GDL filter is an estimate of the power spectrum for the current audio frame of a particular signal component. The outputs from the filters 110 are then fed into a summer/subtractor 130, which is employed to separate or suppress (add or subtract) one or more power spectrums of the signal components from the power spectrum of the input signal. The remaining power spectrum signal having one or more signal components removed or suppressed is then received by signal generator 135, which converts the remaining power spectrum signal into a "signal component reduced output signal" on path 140. Namely, the process of generating the power spectrum is reversed to obtain the output signal. If the suppressed signal component is considered to be noise, then the output signal of path 140 is a noise reduced output signal. A detailed description of using GDL filters to process non-stationary signals is described in an US patent application filed on Apr. 3, 1998 with the title "Method And Apparatus For Filtering Signals Using A Gamma Delay Line Based Estimation Of Power Spectrum" Ser. No. 09/055,043), hereby incorporated by reference.

Furthermore, signal processing section 106 incorporates a detection module 120 of the present invention, which can be coupled to the filters 110. The detection module 120 serves to detect or estimate the presence of a desired signal component, e.g., the presence of a speech component in an audio signal, in the current portion of the input signal. This "presence" information can be used in different applications, e.g., by each GDL filter 110 in its estimation of the power spectrum for a particular signal component. Alternatively, "presence" information can be forwarded on path 150 for use by other signal processing systems, e.g., a voice or command recognition system (not shown).

In one embodiment, the signal processing system 100 is employed as a speech enhancement system. More specifically, a measured speech signal is processed to remove or suppress a signal component within the speech signal that is representative of a "noise".

For example, a measured audio signal within a moving vehicle may comprise a speech signal of a human speaker and other signal components that are broadly grouped as "noise". A desirable feature would be the suppression of the "noise" in the audio signal to produce a clear speech signal of the speaker. The isolated speech signal of the speaker can then be transmitted as a voice signal in telecommunication applications or used to activate a voice command or speech recognition system, e.g., systems that automatically dial a cellular phone upon voice commands.

Although the present invention is applied to a speech enhancement application, it should be understood that the present invention can be adapted to process other non-stationary signals. Namely, the present invention is directed toward the detection of a desired signal component, e.g., a speech component. Once the presence of this desired signal component is detected for a given time instance, e.g., an audio frame, this "presence" information can be effectively exploited by the present signal processing system.

In brief, the present invention employs a probabilistic description to the classification and tracking of a desired signal component. Namely, a dual mixture model is used, where the model densities capture two signal components, e.g., the speech and non-speech features that were observed in the past, e.g., past audio frames. Classification of a new frame is then simply a matter of computing the likelihood that the new frame corresponds to either class. No arbitrary thresholds are involved, since the problem is formulated as a statistical modeling task.

Figure 3:
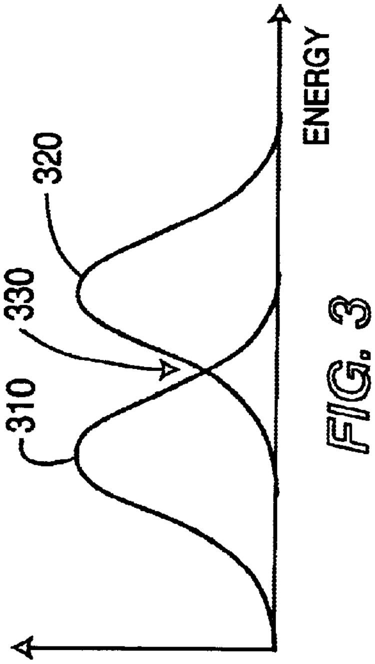
FIG. 3 depicts two curves representing the probability distribution for power spectrum of a noise component and a speech component, respectively.

The principle of the present invention is illustrated using FIG. 3 which illustrates two curves representing the probability distribution for power spectrum of a noise component 310 and a speech component 320. Typically, the power spectrum for an audio frame having only a noise component is smaller relative to the power spectrum for an audio frame having both noise and speech components. More importantly, the curves of FIG. 3 are typically not available to a conventional detection module such that most detection methods simply assign a threshold for distinguishing noise and speech to be somewhere above an average noise power spectrum, e.g., 3 db above the average power spectrum of a noise component. Unfortunately, such fixed threshold is often suboptimal for time-varying Signal-to-Noise Ratio.

However, as can be seen, selecting a threshold for distinguishing noise and speech within the area where the two curves intersect will still lead to erroneous classifications, i.e., a noise only frame being classified as a frame having speech or vice versa. However, if the Gaussian that fits over a particular distribution, e.g., a power distribution for a particular signal component is known, then it is possible to deduce the intersection point, e.g., 330, between two Gaussians for the purpose of selecting the most optimal threshold.

It should be understood that the selection of the most optimal threshold is application specific. Namely, one application may require that every frame having speech must be identified and selected, whereas another application may require that every frame having noise must be omitted. Nevertheless, having knowledge of the relevant Gaussians allow a detection module to best select a threshold (which may or may not be the intersection of the Gaussians) to meet the requirement of a particular application.

Figure 2:
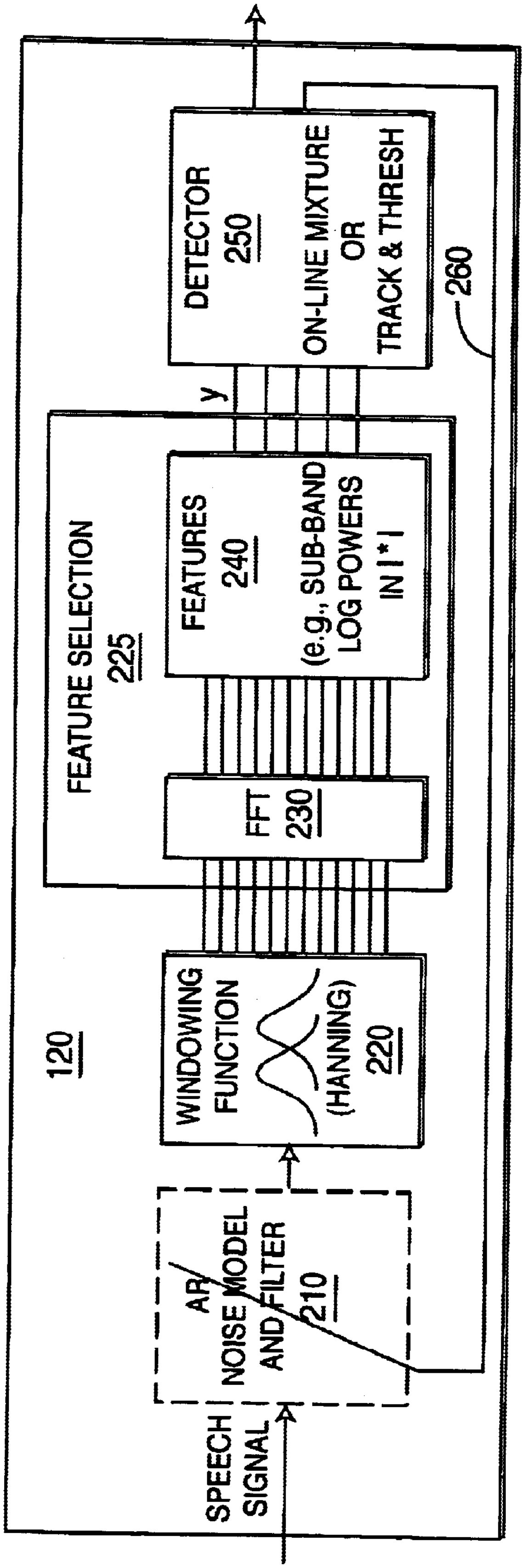
FIG. 2 depicts a block diagram of a speech detection module of the present invention.

FIG. 2 illustrates a block diagram of the present detection module, e.g., a speech detection module 120 having an optional noise filtering module 210, a windowing function module 220, a feature selection module 225, and a detection or classification module 250. The present speech detection module 120 addresses speech detection criticalities by finding a decision function that adapts to the signal and simultaneously adjusts the decision threshold. Namely, the present invention makes an active decision on how much to adjust based on its past. It is therefore a fully unsupervised adaptive method, which requires no prior training or sensitive parameter adjustment.

More specifically, an input signal (e.g., an audio signal) having a combination of noise and speech components is received by the detection module 120 and is optionally filtered by the optional noise filtering module 210. Since the detection or classification module 250 can provide various information with regard to the noise component on a feedback path 260, the optional noise filtering module 210 can be adjusted in accordance with the feedback signal.

However, the optional noise filtering module 210 is typically not activated until the detection or classification module 250 has sufficient time to process a plurality of frames. Namely, it is important that the detection or classification module 250 is provided with sufficient time to initially analyze the raw input signal without introducing possible errors by filtering the input signal. Nevertheless, once the detection or classification module 250 is given sufficient time to analyze the input signal, e.g., accumulating statistical data on the input signal. The classification decision made by the detection or classification module 250 can be exploited by the optional noise filtering module 210 to further enhance the detection and/or classification capability of module 250.

The windowing function module 220 applies a window function, e.g., the Hanning function, to the input audio signal. Namely, the input audio signal is separated into a plurality of frames, e.g., audio frames.

In turn, feature selection module 225 targets or selects one or more features of the input signal that will provide information in the classification of a current frame of the input signal. Namely, the desired signal component is deemed to have some distinguishing features that are distinct or different from a non-desired signal component. For example, as discussed above, the average power spectrum of a noise frame is typically smaller than the average power spectrum of a frame with noise and speech. However, it should be understood that other observations (i.e., features) may exist for other types of input signals, thereby driving the selection criteria of the feature selection module 225.

In the preferred embodiment, the feature selection module 225 employs a Fast Fourier Transform (FFT) module 230 for applying a Fast Fourier transform to each frame of the input audio signal, and a feature extraction or computation module

240 for computing feature vectors for each frame. Namely, the basic assumption is that the feature vectors describing the current frame separates into two distinct clusters or categories corresponding to speech and non-speech states, i.e., a frame with a noise component only or a frame with a noise component and a speech component.

In the preferred embodiment, the on-line Expectation-Maximization (EM) algorithm or method (disclosed by M. Feder, E. Weinstein, and M. V. Oppenheim, "A new class of sequential and adaptive algorithms with application to noise cancellation", in ICASSP 88, pages 557–560, 1988) is used to track a mixture of two Gaussian densities as discussed in the detector module 250. As such, different features vectors on which to base the classification can be utilized. In the preferred embodiment, the logarithmic powers in frequency subbands are used, which for speech signals are routinely modeled by Gaussian distributions. Thus, the suggested features are computed by performing a Fast Fourier Transformation on the current signal frame and then computing the logarithmic powers in 10–20 sub-bands (depending on the computational complexity of a given system) as shown in FIG. 2.

The features y are then modeled by a dual Gaussian mixture density in the detection module 250 as:

$$p(y)=m_1N(y;\mu_1,\Sigma_1)+m_2N(y;\mu_2,\Sigma_2) \qquad (1)$$

Thus, any feature space that matches the above assumptions can be employed. The normal distribution for a d-dimensional feature vector y with mean $\mu$ and covariance $\Sigma$ is defined as, $N(y;\mu,\Sigma)=(2\pi)^{-d/2}|\Sigma|^{-1/2}\exp((y-\mu)^T\Sigma^{-1}(y-\mu))$. The mixture coefficients, $m_1$, $m_2$, the means $\mu_1$, $\mu_2$, and the covariances $\Sigma_1$, $\Sigma_2$ can be obtained from a finite number of frame features y(1), . . . , y(N) using the standard EM algorithm.

Once the parameters have been found, the classification consists of comparing for a given feature sample its corresponding probability $N(y;\mu_I,\Sigma_I)$ of belonging to either of the two clusters i=1, 2. The cluster with the larger mean power $|\mu|$ is assumed to correspond to speech.

However, the standard EM-algorithm needs to iterate through all N samples several times before it converges. Such iteration is computationally expensive and may not be practical for real-time or on-line applications.

Alternatively, in a second embodiment of the present invention, a modified (e.g., on-line) version of the EM update equations is used. Namely, the modified method provides an efficient approximation that does not require iteration, thereby reducing complexity and process time.

More specifically, given the parameters $m_i(k+1)$, $\mu_i(k)$, $\Sigma_i(k)$, i=1, 2 computed for frames 1, 2 . . . , k the new parameters for frame k+1 can be computed from y(k+1) as, $$z_i^{(k)}(k+1)=\frac{m_i(k)N\left(y(k+1);\mu_i(k),\sum_i(k)\right)}{\sum_i m_i(k)N\left(y(k+1);\mu_i(k),\sum_i(k)\right)} \qquad (2)$$

$$w(k)=\sum_i v_i(k) \qquad (3)$$

$$v_i(k+1)=\beta(k)v_i(k)+z_i^{(k)}(k+1) \qquad (4)$$

$$m_i(k+1)=\frac{1}{w(k+1)}\left(\beta(k)w(k)m_i(k)+z_i^{(k)}(k+1)\right) \qquad (5)$$

$$\mu_i(k+1)=\frac{1}{v_ik+1)}\left(\beta(k)v_i(k)\mu_i(k)+z_i^{(k)}(k+1)y(k)\right) \qquad (6)$$

$$\sum_i(k+1)=\frac{1}{v_i(k+1)}\left(\beta(k)v_i(k)\sum_i(k)+z_i^{(k)}(k+1)(y(k+1)-\mu_i(k))(y(k+1)-\mu_i(k))^T\right) \qquad (7)$$

The parameters β(k) is a forgetting factor that controls how much the new parameters consider the past samples. However, a critical decision is the proper selection of the forgetting factor β(k). Most adaptive algorithms use a constant forgetting factor for lack of an objective criterion. Selecting a variable forgetting factor as a function of the previous history is considered active learning in the sense that the algorithm decides how much to learn and how much to forget.

The present invention employs an active learning criterion, which makes a decision for every new frame on how much to learn. This is accomplished by adjusting at every step (i.e., every frame) the forgetting factor β(k) such that the algorithm learns only if the new sample has valuable information compared to the past. This is accomplished by, $$\beta=1-\frac{2|z_i(k)-m_i(k)|}{N} \qquad (8)$$

Due to the illustrative binary decision scenario as discussed above (noise or noise with speech), the expression is symmetric in i=1, 2 and any i can be used. This expression will roughly interpolate between the cases: (a) new feature very novel ($z_i(k+1)>>m_i(k)$) then, $N_{eff}=N/2$, and (b) new feature already well represented ($z_i(k+1)\approx m_i(k)$ then, $N_{eff}=\infty$.

In turn, Gaussians for the two clusters or categories can be deduced and a threshold can be generated from the resulting Gaussians, e.g., at the intersecting point of the Gaussians or at any other points as required by a specific application.

Figure 4:
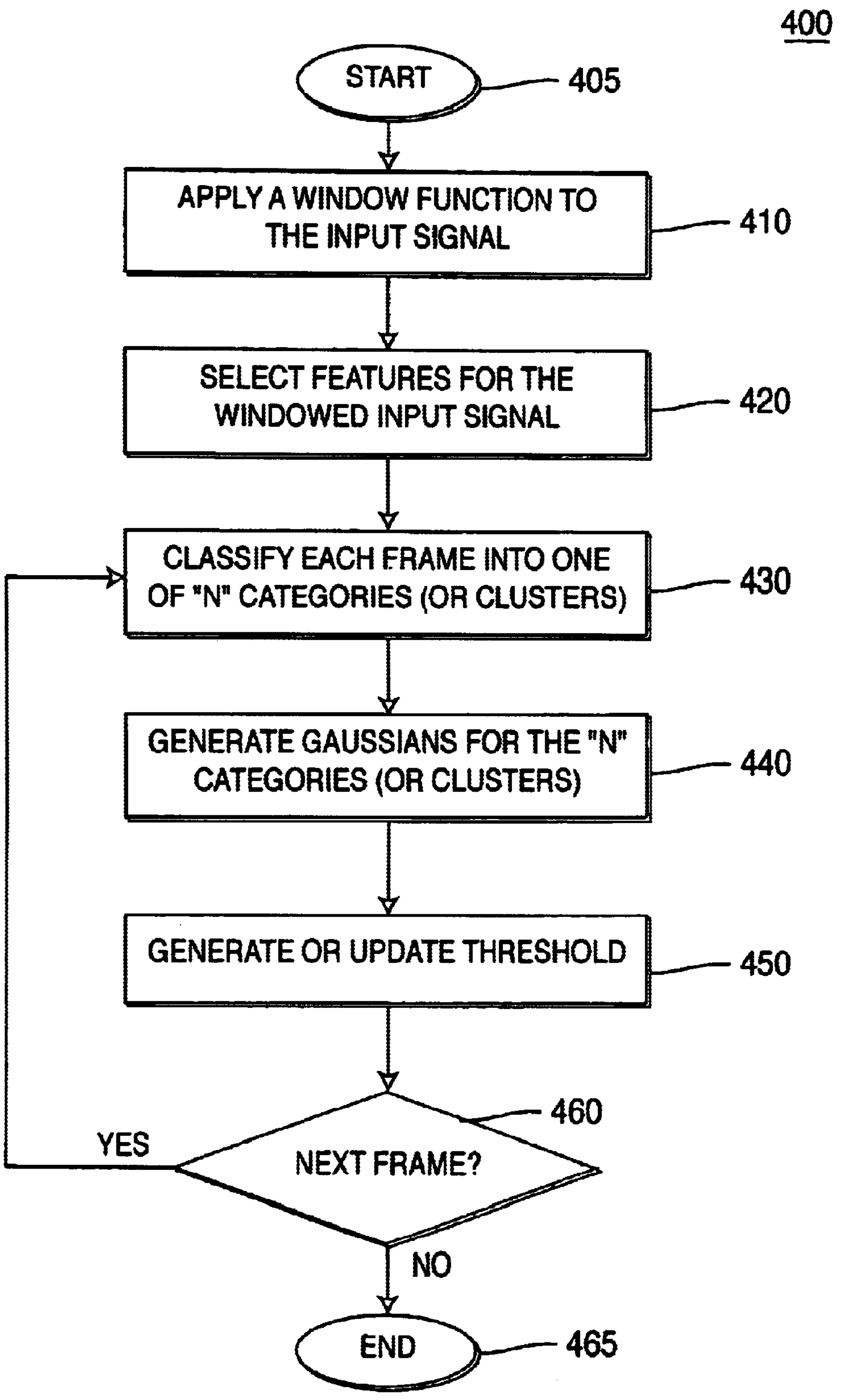
FIG. 4 depicts a flowchart of a method for detecting a desired signal component in a non-stationary signal.

FIG. 4 illustrates a flowchart of a method 400 for detecting a desired signal component in an input signal, e.g., a non-stationary signal. More specifically, method 400 starts in step 405 and proceeds to step 410, where a window function, e.g., a Hanning function, is applied to the input signal to generate a plurality of frames. Other windowing functions can be employed.

In step 420, method 400 selects one or more features that will likely serve to distinguish a desired signal component from a non-desired signal component. In the preferred embodiment, a Fast Fourier transform is applied and the features are based on the sub-band log powers.

In step 430, method 400 classifies each frame into one of N clusters (e.g., N=2 for speech and non-speech frame). In the preferred embodiment, the EM algorithm is employed. Alternatively, an approximation of the EM algorithm can be employed as discussed above.

In step 440, method 400 generates Gaussians for the N clusters and a threshold is generated or updated in step 450 based on said Gaussians.

In step 460, method 400 queries whether additional frames exist. If the query is answered negatively, method 400 ends in step 465. If the query is answered positively, method 400 returns to step 430 and continues to loop until all frames are proceeded.

Figure 5:
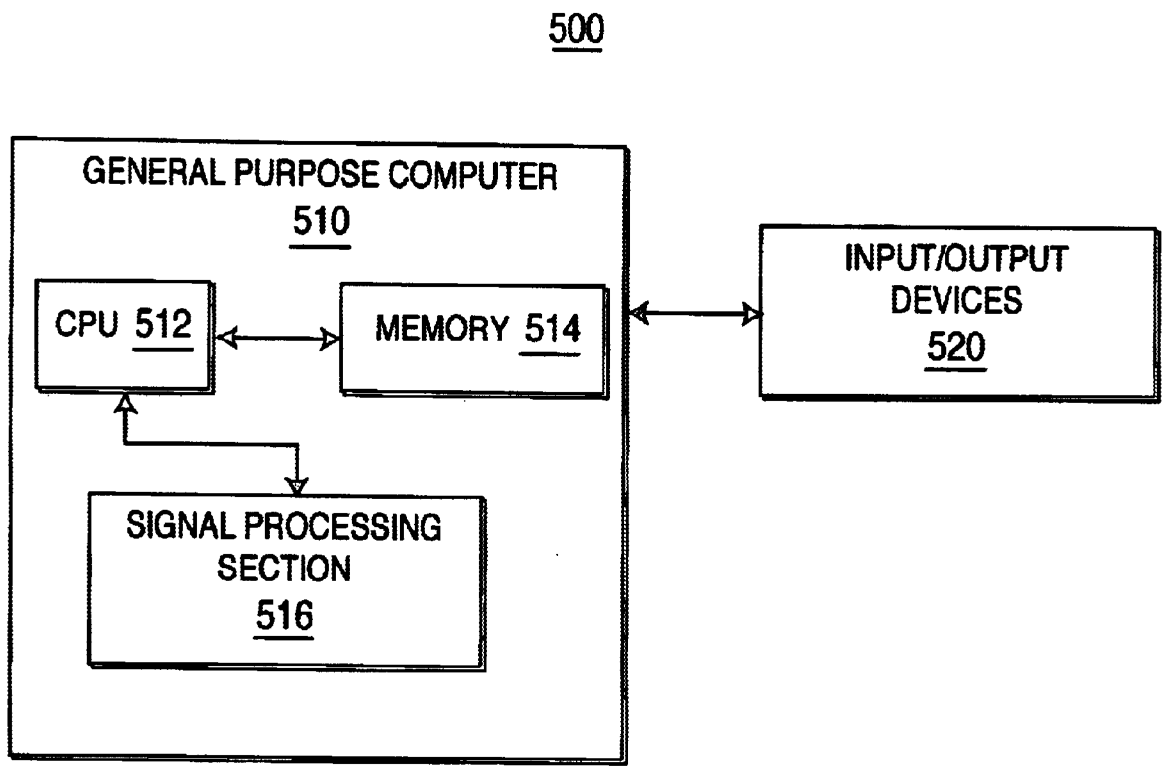
FIG. 5 depicts a block diagram of a signal processing system of the present invention which is implemented using a general purpose computer.

FIG. 5 illustrates a signal processing system 500 of the present invention. The signal processing system comprises a general purpose computer 510 and various input/output devices 520. The general purpose computer comprises a central processing unit (CPU) 512, a memory 514 and a signal processing section 516 for receiving and processing a non-stationary input signal.

In the preferred embodiment, the signal processing section 516 is simply the signal processing section 106 as discussed above in FIG. 1. The signal processing section 516 can be a physical device which is coupled to the CPU 512 through a communication channel. Alternatively, the signal processing section 516 can be represented by a software application, which is loaded from a storage medium, (e.g., a magnetic or optical drive or diskette) and resides in the memory 514 of the computer. As such, the signal processing section 106 of the present invention can be stored on a computer readable medium.

The computer 510 can be coupled to a plurality of input and output devices 520, such as a keyboard, a mouse, an audio recorder, a camera, a camcorder, a video monitor, any number of imaging devices or storage devices, including but not limited to, a tape drive, a floppy drive, a hard disk drive or a compact disk drive. In fact, various devices as discussed above with regard to the preprocessing/signal receiving section of FIG. 1 can be included among the input and output devices 520. The input devices serve to provide inputs to the computer for generating a signal component reduced output signal.

Alternatively, the present invention can also be implemented using application specific integrated circuits (ASIC).

Although various embodiments which incorporate the teachings of the present invention have been shown and described in detail herein, those skilled in the art can readily devise many other varied embodiments that still incorporate these teachings.

What is claimed is:

1. A signal processing method for detecting a presence of a desired signal component from an input signal having more than one signal component, said method comprising the steps of:

a) applying a windowing function to the input signal to generate a plurality of frames;

b) selecting at least one feature for processing said plurality of frames; and c) detecting the presence of the desired signal component in said frames in accordance with said selected feature by categorizing said frames using a probabilistic description, wherein said detecting step (c) employs an Expectation-Maximization method having a probabilistic description of $p(y)=m_1N(y\ ;\mu_1,\Sigma_1)+m_2N(y\ ;\mu_2,\Sigma_2)$, wherein said probabilistic description is optimized in a single pass.

2. The method of claim 1, wherein said detecting step (c) employs a modified Expectation-Maximization (EM) method.

3. The method of claim 2, wherein said detecting step (c) employs said modified Expectation-Maximization (EM) having the following parameters:

$$z_i^{(k)}(k+1)=\frac{m_i(k)N\left(y(k+1);\mu_i(k),\sum_i(k)\right)}{\sum_i m_i(k)N\left(y(k+1);\mu_i(k),\sum_i(k)\right)};$$

-continued $$w(k)=\sum_i v_i(k);$$

$$v_i(k+1)=\beta(k)v_i(k)+z_i^{(k)}(k+1);$$

$$m_i(k+1)=\frac{1}{w(k+1)}\left(\beta(k)w(k)m_i(k)+z_i^{(k)}(k+1)\right);$$

$$\mu_i(k+1)=\frac{1}{v_ik+1)}\left(\beta(k)v_i(k)\mu_i(k)+z_i^{(k)}(k+1)y(k)\right);\text{ and}$$

$$\sum_i(k+1)=\frac{1}{v_i(k+1)}\left(\beta(k)v_i(k)\sum_i(k)+z_i^{(k)}(k+1)(y(k+1)-\mu_i(k))(y(k+1)-\mu_i(k))^T\right).$$

4. The method of claim 3, wherein said detecting step (c) employs said modified Expectation-Maximization (EM) having the following forgetting factor $$\beta=1-\frac{2|z_i(k)-m_i(k)|}{N}.$$

5. The method of claim 1, wherein said detecting step (c) detects the presence of the desired signal component that is a speech component.

6. A signal processing apparatus for detecting a presence of a desired signal component from an input signal having more than one signal component, said apparatus comprising:

a windowing module for applying a windowing function to the input signal to generate a plurality of frames;

a feature selection module for selecting at least one feature for processing said plurality of frames; and a detection module for detecting the presence of the desired signal component in said frames in accordance with said selected feature by categorizing said frames using a probabilistic description, wherein said probabilistic description employs an Expectation-Maximization (EM) method, wherein said probabilistic description is $p(y)=m_1N(y\ ;\mu,\Sigma_1)+m_2N(y',\mu_2,\Sigma_2)$, wherein said probabilistic description is optimized in a single pass.

7. The apparatus of claim 6, wherein said probabilistic description employs a modified Expectation-Maximization (EM) method.

8. The apparatus of claim 7, wherein said modified Expectation-Maximization (EM) has the following parameters:

$$z_i^{(k)}(k+1)=\frac{m_i(k)N\left(y(k+1);\mu_i(k),\sum_i(k)\right)}{\sum_i m_i(k)N\left(y(k+1);\mu_i(k),\sum_i(k)\right)};$$

$$w(k)=\sum_i v_i(k);$$

$$v_i(k+1)=\beta(k)v_i(k)+z_i^{(k)}(k+1);$$

-continued $$m_i(k+1) = \frac{1}{w(k+1)}\left(\beta(k)w(k)m_i(k) + z_i^{(k)}(k+1)\right);$$

$$\mu_i(k+1) = \frac{1}{v_i k+1)}\left(\beta(k)v_i(k)\mu_i(k) + z_i^{(k)}(k+1)y(k)\right); \text{ and}$$

$$\sum_i(k+1) = \frac{1}{v_i(k+1)}\left(\beta(k)v_i(k)\sum_i(k) + z_i^{(k)}(k+1)(y(k+1)-\mu_i(k))(y(k+1)-\mu_i(k))^T\right).$$

9. The apparatus of claim 8, wherein said modified Expectation-Maximization (EM) has a forgetting factor $$\beta = 1 - \frac{2|z_i(k) - m_i(k)|}{N}.$$

10. The apparatus of claim 6, wherein said desired signal component that is a speech component.

11. A computer-readable medium having stored thereon a plurality of instructions, the plurality of instructions including instructions which, when executed by a processor, cause the processor to perform the steps comprising of:

a) applying a windowing function to the input signal to generate a plurality of frames;

b) selecting at least one feature for processing said plurality of frames; and c) detecting the presence of the desired signal component in said frames in accordance with said selected feature by categorizing said frames using a probabilistic description, wherein said detecting step (c) employs an Expectation-Maximization method having a probabilistic description of $p(y)=m_1N(y',\mu_1,\Sigma_1)+m_2N(y',\mu_2,\Sigma_2)$, wherein said probabilistic description is optimized in a single pass.

12. The computer-readable medium of claim 11, wherein said detecting step (c) employs a modified Expectation-Maximization (EM) method.

13. The computer-readable medium of claim 12, wherein said detecting step (c) employs said modified Expectation-Maximization (EM) having the following parameters:

$$z_i^{(k)}(k+1) = \frac{m_i(k)N\left(y(k+1);\ \mu_i(k),\ \sum_i(k)\right)}{\sum_i m_i(k)N\left(y(k+1);\ \mu_i(k),\ \sum_i(k)\right)};$$

$$w(k) = \sum_i v_i(k);$$

$$v_i(k+1) = \beta(k)v_i(k) + z_i^{(k)}(k+1);$$

$$m_i(k+1) = \frac{1}{w(k+1)}\left(\beta(k)w(k)m_i(k) + z_i^{(k)}(k+1)\right);$$

$$\mu_i(k+1) = \frac{1}{v_i k+1)}\left(\beta(k)v_i(k)\mu_i(k) + z_i^{(k)}(k+1)y(k)\right); \text{ and}$$

$$\sum_i(k+1) = \frac{1}{v_i(k+1)}\left(\beta(k)v_i(k)\sum_i(k) + z_i^{(k)}(k+1)(y(k+1)-\mu_i(k))(y(k+1)-\mu_i(k))^T\right).$$

14. The computer-readable medium of claim 13, wherein said detecting step (c) employs said modified Expectation-Maximization (EM) having the following forgetting factor $$\beta = 1 - \frac{2|z_i(k) - m_i(k)|}{N}.$$

* * * * *